US012310926B1

(12) United States Patent
Sletten et al.

(10) Patent No.: US 12,310,926 B1
(45) Date of Patent: May 27, 2025

(54) BEVERAGE CONTAINER WITH CONVERTIBLE CONFIGURATION

(71) Applicants: Scott Sletten, Sioux Falls, SD (US); Russ Paul Odens, Sioux Falls, SD (US)

(72) Inventors: Scott Sletten, Sioux Falls, SD (US); Russ Paul Odens, Sioux Falls, SD (US)

(73) Assignee: JDS Industries, Inc., Sioux Falls, SD (US)

( * ) Notice: Subject to any disclaimer, the term of this patent is extended or adjusted under 35 U.S.C. 154(b) by 34 days.

(21) Appl. No.: 18/200,687

(22) Filed: May 23, 2023

(51) Int. Cl.
*A61J 9/06* (2006.01)
*A61J 9/00* (2006.01)
*A61J 9/08* (2006.01)

(52) U.S. Cl.
CPC ............. *A61J 9/0623* (2015.05); *A61J 9/006* (2013.01); *A61J 9/085* (2013.01)

(58) Field of Classification Search
CPC ........... A61J 9/0623; A61J 9/006; A61J 9/085
USPC ........................................................ 215/11.1
See application file for complete search history.

(56) References Cited

U.S. PATENT DOCUMENTS 4,600,111 A 7/1986 Brown
6,872,116 B1 * 3/2005 Dunnum ............... A61J 9/0623 206/217
7,556,172 B2 7/2009 Lane
7,669,725 B2 3/2010 Randolph
D630,048 S * 1/2011 Boonprasop ................... D7/393
9,775,454 B2 * 10/2017 Gonzalez .......... B01F 33/50111
9,827,168 B2 * 11/2017 Honarvar .................. A61J 9/06
11,147,744 B1 * 10/2021 Duong .................. A61J 9/0623
2005/0056611 A1 * 3/2005 Hakim ..................... A61J 11/00 215/396
2006/0273059 A1 * 12/2006 Mendenhall ......... A61J 11/0085 215/396
2006/0278597 A1 * 12/2006 Daugherty .............. G01F 19/00 215/396
2008/0223808 A1 * 9/2008 Mendenhall ......... A61J 11/0085 215/396

(Continued)

OTHER PUBLICATIONS

Amazon Comotomo (Year: 2018).*
Etsy Hydro Handle (Year: 2021).*
Hydro handle 2 (Year: 2020).*

*Primary Examiner* — Ernesto A Grano
*Assistant Examiner* — Symren K Sanghera
(74) *Attorney, Agent, or Firm* — Jeffrey A. Proehl; Woods, Fuller, Shultz & Smith PC

(57) ABSTRACT

A convertible beverage container may have a base structure having an interior configured to hold a liquid, and a lid structure removably mountable on the base structure over an open top to selectively close the open top. The lid structure may have a mounted condition characterized by the beverage container being able to at least partially retain a liquid in the interior of the base structure and an unmounted condition characterized by the beverage container being unable to retain a liquid in the interior of the base structure. The beverage container may further include a handle structure directly and removably mountable on the lid structure such that the handle structure is mountable on the base structure via the mounting of the handle structure on the lid structure when the lid structure is mounted on the base structure.

20 Claims, 4 Drawing Sheets

(56) References Cited

U.S. PATENT DOCUMENTS

| | | | | |
|---|---|---|---|---|
| 2010/0308003 | A1 | 12/2010 | Morrill | |
| 2013/0098932 | A1* | 4/2013 | Hunt | A61J 9/0623 220/772 |
| 2013/0327738 | A1* | 12/2013 | Harrison | B65D 15/14 215/44 |
| 2014/0069946 | A1* | 3/2014 | Gubitosi | A47G 19/2272 220/713 |
| 2017/0065111 | A1* | 3/2017 | Phipps | A47G 19/2272 |

* cited by examiner

BEVERAGE CONTAINER WITH CONVERTIBLE CONFIGURATION

BACKGROUND

Field

The present disclosure relates to beverage containers and more particularly pertains to a new beverage container with convertible configuration for providing a multipurpose beverage container useful by children during multiple stages of drinking development.

SUMMARY

In some aspects, the present disclosure relates to a convertible beverage container having at least two configurations, and the beverage container may comprise a base structure having an interior configured to hold a liquid and having a closed bottom and an open top. The base structure may include a perimeter wall extending between the bottom and top of the base structure, and a bottom wall positioned at the bottom of the base structure opposite of the open top. The beverage container may further comprise a lid structure removably mountable on the base structure over the open top to selectively close the open top. The lid structure may have a mounted condition characterized by the beverage container being able to at least partially retain a liquid in the interior of the base structure and an unmounted condition characterized by the beverage container being unable to retain a liquid in the interior of the base structure. The beverage container may also comprise a handle structure directly and removably mountable on the lid structure such that the handle structure is mountable on the base structure via the mounting of the handle structure on the lid structure when the lid structure is mounted on the base structure.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
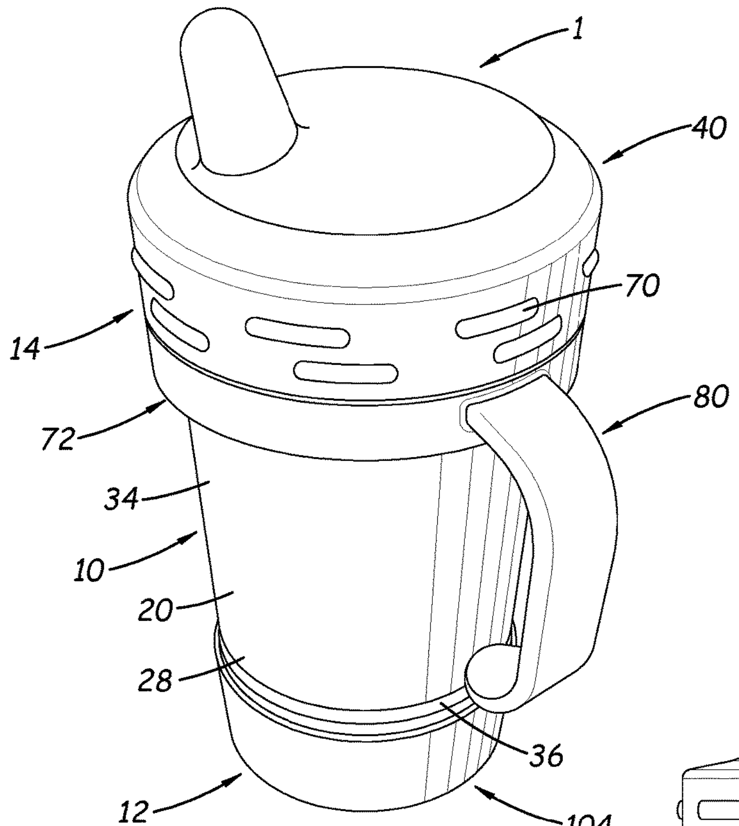
FIG. 1 is a schematic perspective view of a new beverage container with convertible configuration according to the present disclosure.
Figure 2:
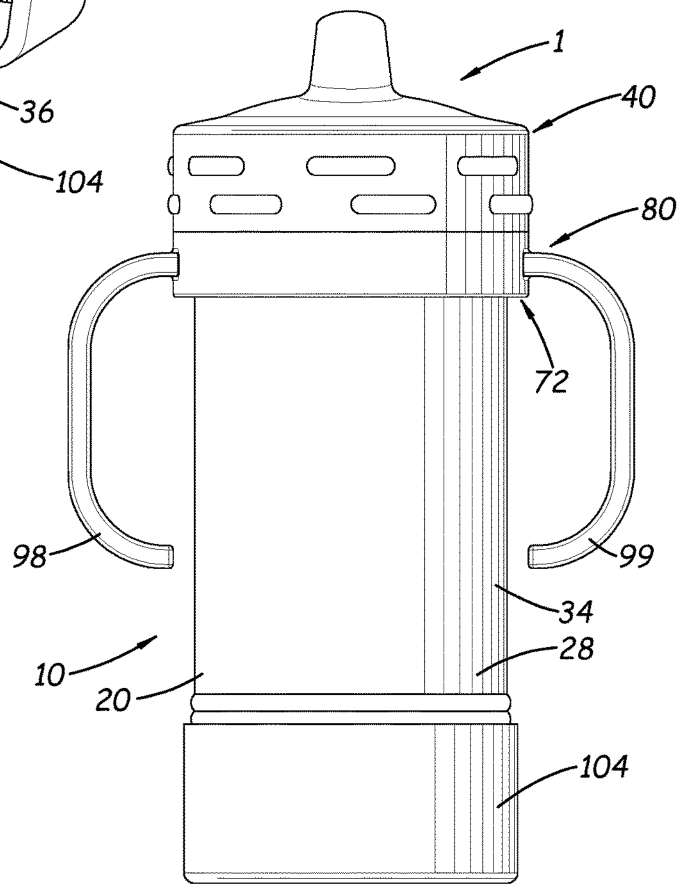
FIG. 2 is a schematic side view of the beverage container in a first configuration including the base structure, the lid structure, and the handle structure, according to an illustrative embodiment.
Figure 3:
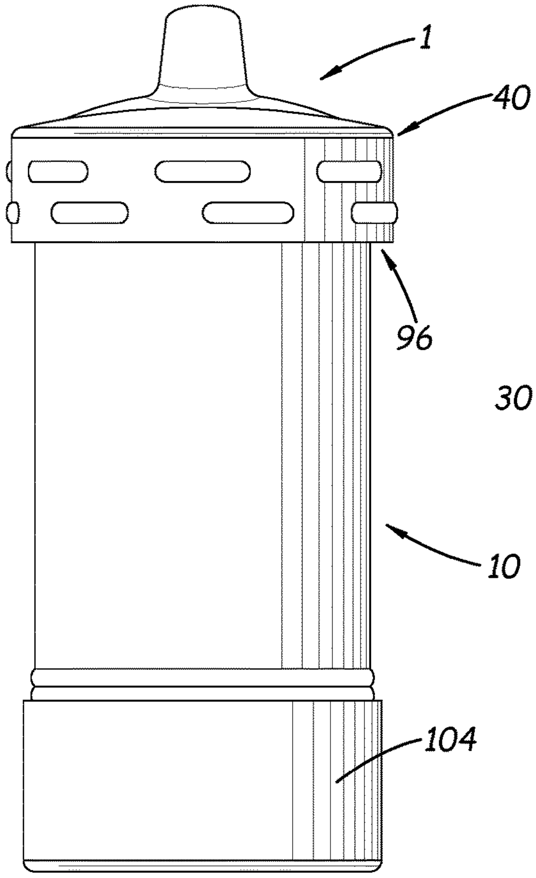
FIG. 3 is a schematic side view of the beverage container in a second configuration including the base structure and the lid structure without the handle structure, according to an illustrative embodiment.
Figure 4:
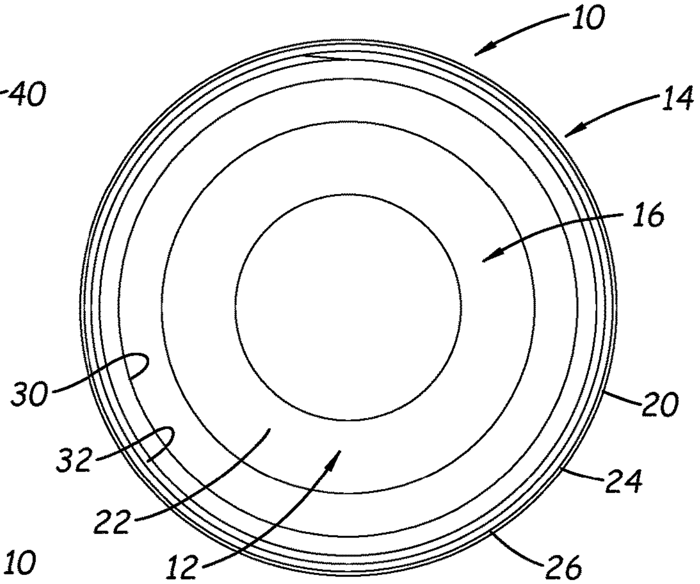
FIG. 4 is a schematic top view of the base structure of the container, according to an illustrative embodiment.
Figure 5:
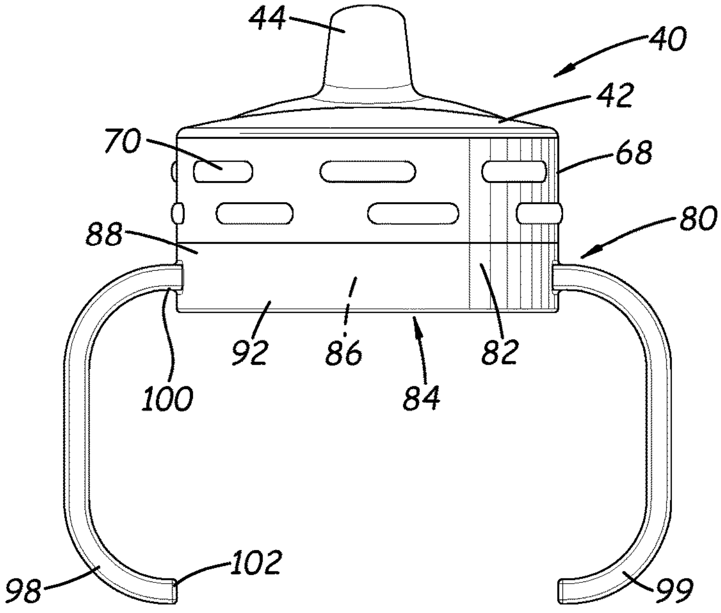
FIG. 5 is a schematic side view of the lid structure and handle structure of the container, according to an illustrative embodiment.
Figure 6:
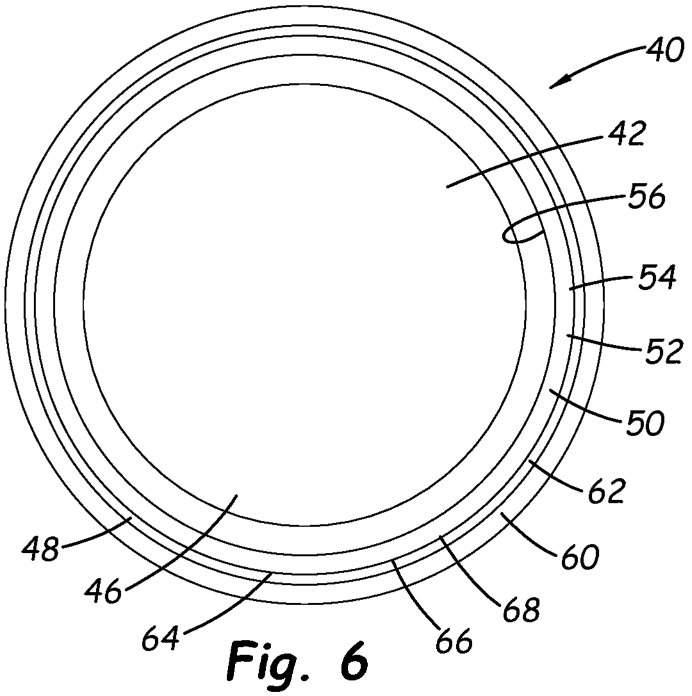
FIG. 6 is a schematic bottom view of the lid structure of the container, according to an illustrative embodiment.
Figure 7:
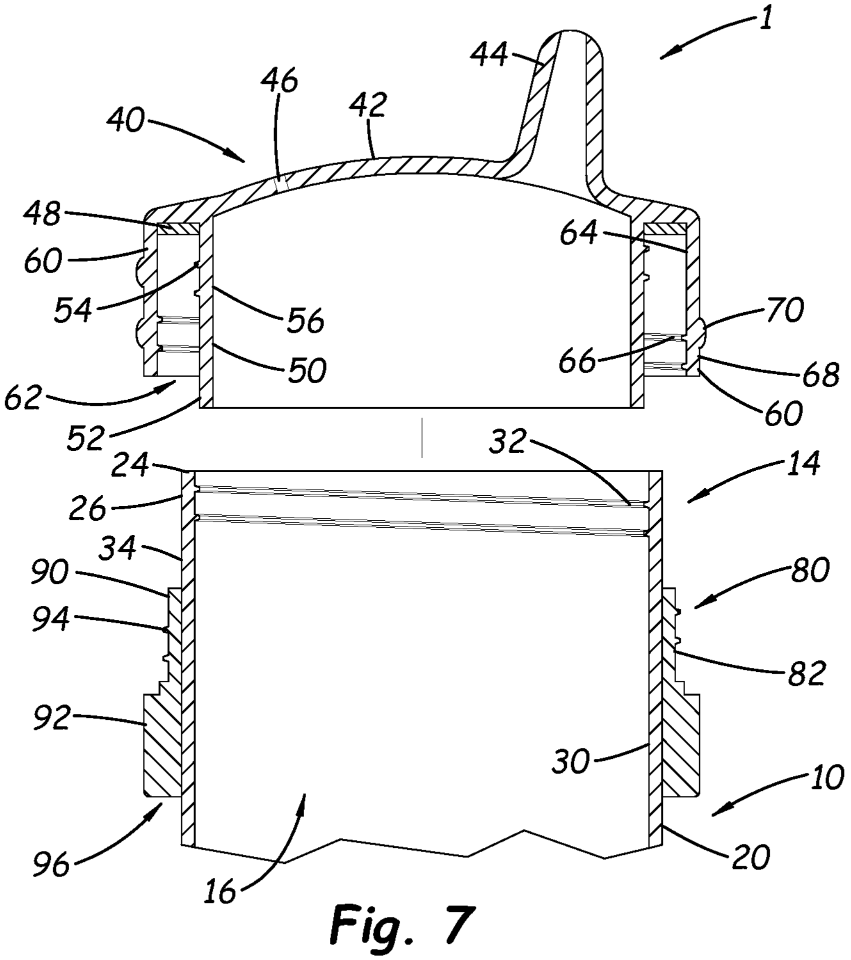
FIG. 7 is a schematic side sectional view of the lid structure, the handle structure, and a portion of the base structure of the container, according to an illustrative embodiment.
Figure 8:
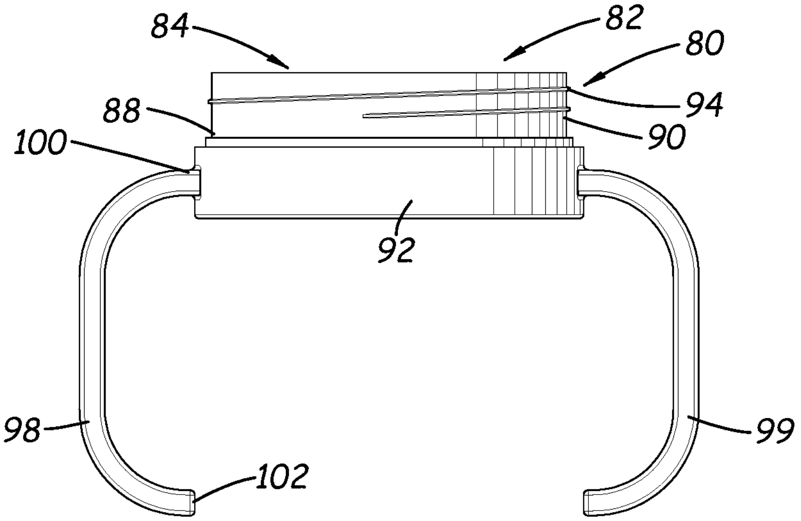
FIG. 8 is a schematic side view of the handle structure of the container, according to an illustrative embodiment.
Figure 9:
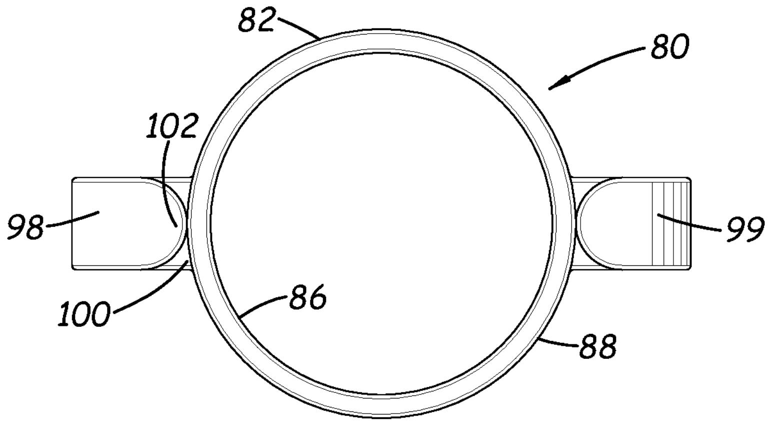
FIG. 9 is a schematic bottom view of the handle structure of the container, according to an illustrative embodiment.
Figure 10:
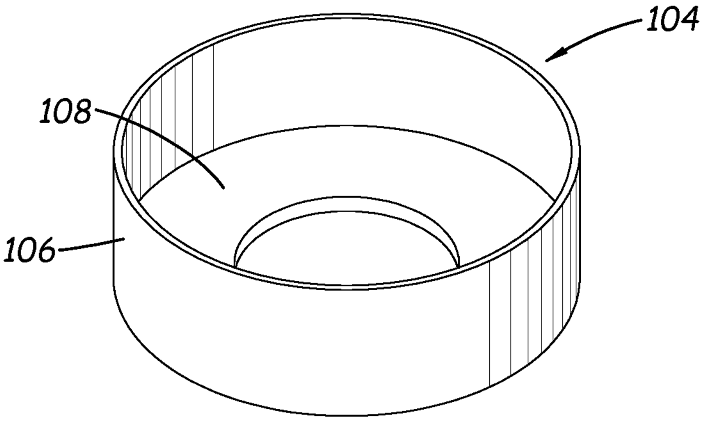
FIG. 10 is a schematic perspective view of a sleeve element isolated from other elements of the container, according to an illustrative embodiment.

With reference now to the drawings, and in particular to FIGS. 1 through 10 thereof, a new beverage container with convertible configuration embodying the principles and concepts of the disclosed subject matter will be described.

The applicants have recognized that while “sippy” cups are ubiquitous, few have much use beyond a certain stage of the child’s life. Even the configuration of the sippy cup can limit the useful lifespan of the cup for a particular child, as the child progresses from relatively smaller hands only able to grip handles of a cup to relatively larger hands able to grasp the body of the cup without heeding the handle.

While attempts have been made to design sippy-style cups which bridge these two stages of the child’s development, the designs have left something to be desired. The designs, while being convertible to permit the removal of the handles from the cup to accommodate the child’s later development, have a number of drawbacks that affect the ease of reconfiguration and use of the cup. For example, with many prior designs, the removable handles are simply trapped between two other elements of the cup assembly, such as the cup body and the cup lid, so that removing the lid to refill the cup frees the handles to fall from the cup body if jostled during refilling.

The applicants have developed a beverage container useful as a sippy cup in which a handle structure is not simply trapped between a base structure and a lid structure of the cup, but the handle structure is secured to either the base structure or the lid structure when the lid structure is removed from the base structure during refilling of the container. In some preferred embodiments, the handle structure is able to be removed as unit with the lid structure when the lid structure is removed from the body structure so that the handle structure is out of the way when the body structure is being refilled with a beverage. In some preferred embodiments, the handle structure is directly threaded onto the lid structure to facilitate removal of the handle structure from the lid structure when reconfiguration is desired, but otherwise leaves the handle structure securely mounted on the lid structure during times between reconfigurations. In some further preferred embodiments, the handle structure is removable from the lid structure while the lid structure remains mounted on the base structure by disconnecting the handle structure from the lid structure and sliding the handle structure over the base structure. Moreover, the lid structure may be configured so that, when the handle structure is removed from the lid and base structures, no gap is exposed on the outer surface of the beverage container by the absence of the handle structure to potentially pinch small fingers.

Also, in some embodiments, a shoulder is formed with respect to the outer surface of the base structure both when the handle structure is mounted on the lid structure, and when the handle structure is removed, to facilitate a child's gripping of the base structure without slippage of the base structure through the hands of the child.

The disclosure generally relates to a convertible beverage container 1 for holding a liquid beverage and permitting consumption of the liquid beverage from the container. Features and elements of the beverage container 1 may make the container highly suitable for use as a "sippy cup" that facilitates consumption by infants and young children.

In aspects of the disclosure, the beverage container 1 may be convertible between at least two configurations of elements of the container. In the illustrative embodiments, a first configuration of the beverage container 1 includes one or more protruding handles. The first configuration may be highly suitable for use by a relatively younger child with relatively smaller hands, as the handler handles may be easier to grip by smaller hands by virtue of each handle being smaller than larger or bulkier portions of the container 1. Also in the illustrative embodiments, a second configuration of the beverage container lacks the one or more handles, and thus may be highly suitable for use by a relatively older child with relatively larger hands which are better able to grasp larger or bulky or portions of the container.

In the illustrative embodiments, the beverage container 1 may generally comprise a base structure 10 for receiving a liquid to be consumed, a lid structure 40 which is removably mountable on the base structure, and a handle structure 80 removably mountable on the lid structure and base structure.

A greater detail, the base structure 10 has a bottom 12 and a top 14, with the bottom being closed and the top being open. When oriented for use, the bottom 12 of the base structure may be rested upon a surface and the top 14 may be located above the bottom. The base structure may define an interior 16 that extends between the closed bottom and the open top for receiving liquid contents into the container 1. The base structure 10 may comprise a perimeter wall 20 that extends between the bottom 12 and the top 14 of the base structure and a bottom wall 22 that is located at the bottom of the base structure in a location that is opposite of the open top.

The perimeter wall 20 may have an upper edge 24 which may form the open top 14 of the container. The perimeter wall 20 generally has an upper portion 26 extending from the upper edge 24 downwardly toward the bottom of the base structure, and a lower portion 28 extending from the bottom 12 of the base structure upwardly toward the top 12. The perimeter wall 20 may also have an inner surface 30 that extends from the upper edge 24 in the direction of the bottom 12 of the container. A portion of the inner surface 30 located adjacent to the upper edge 24 may have interior threads 32 formed thereon. The perimeter wall 20 has an outer surface 34 opposite of the inner surface, and the outer surface at the upper portion 26 of the perimeter wall may be smooth and substantially cylindrical in shape. The outer surface 34 of the upper portion may define a first diameter. The outer surface of the lower portion of the perimeter wall may optionally have at least one circumferential rib 36 formed thereon, and may include a plurality of circumferential ribs.

The lid structure 40 may be removably mountable on the base structure, and may be positionable over the open top 14 of the base structure to selectively close the open top and form the upper boundary of the interior of the base structure. In embodiments, the lid structure 40 is directly mountable on the base structure, such as without intervening or intermediate elements.

The lid structure 40 may have has a mounted condition and an unmounted condition with respect to the base structure 10. The mounted condition may be characterized by the lid structure closing the open top 14 of the base structure such that the beverage container 1 is able to at least partially retain a liquid in the interior 16 of the base structure, subject to the liquid being drawn out by the mouth of the user. The unmounted condition may be characterized by the lid structure being removed from the open top 14 such that the beverage container 1 is generally unable to retain a liquid in the interior of the base structure.

The lid structure 40 may further have a first condition and a second condition, with the first condition of the lid structure corresponding to the first configuration of the beverage container and the second condition of the lid structure corresponding to the second configuration of the beverage container.

In the illustrative embodiments, the lid structure 40 comprises an upper wall 42 that is positioned across the open top of the base structure when the lid structure is in the mounted condition on the base structure. The upper wall 42 may have a sipping spout 44 formed thereon, and may also have a vent opening 46 formed therein which typically is located opposite of the spout 44. In embodiments, the lid structure 40 may include a gasket 48 that is positioned adjacent to an underside of the upper wall 42 for abutting against the upper edge 24 of the perimeter wall when the lid structure is in the mounted condition with respect to the base structure, to facilitate a substantially liquid tight seal between the lid and base structures.

The lid structure 40 may also comprise an inner lip wall 50 which is united to the upper wall 42 and may be configured to engage the base structure in the mounted condition. In the mounted condition, the inner lip wall 50 may be at least partially insertable into the open top 14 of the base structure, and the inner lip wall 50 has an outward surface 52 which may engage the inner surface 30 of the perimeter wall of the base structure. The outward surface 52 may have exterior threads 54 formed thereon to engage the interior threads 32 formed on the inner surface of the base element. The inner lip wall 50 may extend generally perpendicular to the upper wall 42, and may be cylindrical in shape. The inner lip wall 50 may have an inward opposite surface 56 which is positioned opposite of the outward surface 52, and the surface 56 may be smooth and substantially cylindrical in shape.

In the illustrative embodiments, the lid structure 40 may further comprise an outer lip wall 60 which may be positioned outside of the base structure 10 when the inner lip wall 50 is at least partially inserted into the base structure, such as when the lid structure is in the mounted condition. The outer lip wall 60 may extend substantially parallel to the inner lip wall 50 to form an annular gap 62 between the inner and outer lip walls. The inner 50 and outer 60 lip walls may be coaxial such that the gap 62 has a substantially uniform width about the lid structure. The gasket 48 may be positioned in the annular gap.

The outer lip wall 60 has an inward surface 64 which is oriented in opposition to the outward surface 52 of the inner lip wall. The inward surface 64 of the outer lip wall may be configured to engage features on the handle structure 80. Illustratively, the inward surface 64 may be provided with interior threads 66 thereon for engaging complementary exterior threads of the handle structure. The outer lip wall 60 may extend generally perpendicular to the upper wall 42 and may be substantially cylindrical in shape. The outer lip wall 60 has an outer face 68 and may have a plurality of gripping protrusions 70 which each may extend along a circumferential section of the outer face. The outer face 68 has a second diameter which may be greater in size than the first diameter of the outer surface 34 of the base structure to thereby produce a shoulder 72 on the beverage container.

The handle structure 80 may be removably mountable on the lid structure 40, and may be removably mountable on the base structure 10 via the lid structure. The lid structure 40 may form the sole connection of the handle structure to the base structure. In embodiments, the handle structure 80 may be removable from the lid structure without requiring removal of the lid structure from the base structure. The handle structure 80 may be removable from the base structure without requiring removal of the lid structure from the base structure. The handle structure 80 and the lid structure 40 may be removable as a unit from the base structure 10.

The handle structure 80 may comprise a collar portion 82 which may define an opening 84 configured to receive a portion of the base structure 10, such as the upper portion 26 of the perimeter wall. The collar portion 82 may be at least partially insertable into the annular gap 62 of the lid structure. The collar portion 82 may extend about the opening 84. The collar portion 82 may be circular and may be cylindrical. The collar portion 82 may have an interior surface 86 that defines the opening 84, and may be smooth in character to permit the outer surface 34 of the perimeter wall to slide through the opening.

The collar portion 82 may also have an exterior surface 88 which may have an upper section 90 and a lower section 92. The upper section 90 may be configured to engage the lid structure 40. The upper section 90 may be configured to removably mount on the outer lip wall 60 of the lid structure, and may have exterior threads 94 formed thereon to engage the interior threads 66 on the inward surface 64 of the outer lip wall of the lid structure.

The lower section 92 may have a third diameter, and the third diameter may be greater than the first diameter of the outer surface 34 of the upper portion of the base structure 10 to produce a secondary shoulder 96 on the collar portion with respect to the base structure. In some embodiments, the third diameter may be substantially equal to the second diameter.

The handle structure 80 may comprise at least one handle portion 98 which may extend from the collar portion 82. The handle portion 98 may be positioned on the lower section 92 of the exterior surface of the collar portion. The handle portion 98 may have a base end 100 mounted on the collar portion 82 and a free end 102 which is opposite of the base end. Illustratively, the handle portion 98 may be substantially arcuate in shape, and may be configured to extend generally adjacent to the perimeter wall 20 of the base structure when the handle structure and lid structure are mounted on the base structure, and the free end 102 is spaced from the outer surface 34 of the perimeter wall of the base structure. In illustrative embodiments, a pair of the handle portions 98, 99 may be provided on the handle structure 80. The handle portions 98, 99 may be positioned at substantially opposite circumferential locations on the collar portion 82, and may extend from the collar portion in substantially opposite directions.

In some embodiments, the beverage container 1 may also include a sleeve element 104 for selectively covering a portion of the base structure 10 adjacent to the bottom 12 of the base structure. The sleeve element 104 may be removably mounted on the base structure, and illustratively may be removably secured by friction. The sleeve element 104 may be formed of a resiliently compressible material (such as a silicone material) to facilitate a degree of stretching of the sleeve element when the sleeve element is mounted on the base structure by sliding the element 104 over the bottom and lower portion 28 of the base structure. The resiliently compressible character of the material of the sleeve element 104 may also cushion impacts between the bottom 12 of the base structure and a hard surface.

Illustratively, the sleeve element 104 may include a first wall portion 106 for positioning adjacent to the perimeter wall 20 of the base structure, and may be substantially cylindrical in shape. The sleeve element 104 may also include a second wall portion 108 for positioning adjacent to the bottom wall of the base structure, and may be substantially planar in shape. Illustratively, the first wall portion 106 and the second wall portion 108 may be formed by a single integral piece of material.

It should be appreciated that in the foregoing description and appended claims, that the terms “substantially” and “approximately,” when used to modify another term, mean “for the most part” or “being largely but not wholly or completely that which is specified” by the modified term, and may be further quantified as values or qualities which deviate approximately 10 percent or less from the value or quality or relationship stated in the disclosure.

It should also be appreciated from the foregoing description that, except when mutually exclusive, the features of the various embodiments described herein may be combined with features of other embodiments as desired while remaining within the intended scope of the disclosure.

In this document, the terms “a” or “an” are used, as is common in patent documents, to include one or more than one, independent of any other instances or usages of “at least one” or “one or more.” In this document, the term “or” is used to refer to a nonexclusive or, such that “A or B” includes “A but not B,” “B but not A,” and “A and B,” unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A convertible beverage container having at least two configurations, the beverage container comprising:

a base structure having an interior configured to hold a liquid, the base structure having a closed bottom and an open top, the base structure comprising:

a perimeter wall extending between the bottom and top of the base structure; and a bottom wall positioned at the bottom of the base structure opposite of the open top;

a lid structure removably mountable on the base structure over the open top to selectively close the open top, the lid structure having a mounted condition characterized by the lid structure being mounted on the beverage container and an unmounted condition characterized by the lid structure being removed from the beverage container; and a handle structure including a collar portion defining an opening configured to receive a portion of the base structure and at least one handle portion extending from the collar portion;

wherein the lid structure comprises:

an upper wall positionable across the open top of the base structure when the lid structure is in the mounted condition;

an inner lip wall united to the upper wall and configured to be at least partially inserted into the open top of the base structure when the lid structure is mounted on the base structure;

an outer lip wall united to the upper wall and configured to be positioned outside of the base structure when the inner lip wall is at least partially inserted into the open top of the base structure; and an annular gap being formed between the inner and outer lip walls, the annular gap being configured to receive a portion of the collar portion of the handle structure and a portion of the perimeter wall of the base structure when the lid structure is in the mounted condition.

2. The container of claim 1 wherein the outer lip wall is configured to engage the collar portion of the handle structure and the inner lip wall is configured to engage the base structure such that the lid structure forms the sole connection of the handle structure to the base structure.

3. The container of claim 1 wherein the handle structure is removable from the lid structure without requiring removal of the lid structure from the base structure.

4. The container of claim 1 wherein the inner lip wall of the lid structure has exterior threads engageable with interior threads on the base structure and the outer lip wall of the lid structure has interior threads engageable with interior threads on the collar portion of the handle structure such that the handle structure removably mounted on the base structure via the lid structure when the lid structure is mounted on the base structure.

5. The container of claim 1 wherein the handle structure and the lid structure are removable as a unit from the base structure.

6. The container of claim 1 wherein the at least one handle portion is configured to extend generally adjacent to base structure when the handle structure and lid structure are mounted on the base structure.

7. The container of claim 1 wherein the at least one handle portion comprises a pair of handle portions, the handle portions being positioned at substantially opposite circumferential locations on the collar portion.

8. The container of claim 1 wherein the base structure, the lid structure, and the handle structure have a first configuration and a second configuration, the first configuration being characterized by the handle structure being mounted on the lid structure and the lid structure being mounted on the base structure, the second configuration being characterized by the lid structure being mounted on the base structure and the handle structure is dismounted from both the lid structure and the base structure.

9. A convertible beverage container having at least two configurations, the beverage container comprising:

a base structure having an interior configured to hold a liquid, the base structure having a closed bottom and an open top, the base structure comprising:

a perimeter wall extending between the bottom and top of the base structure; and a bottom wall positioned at the bottom of the base structure opposite of the open top;

a lid structure removably mountable on the base structure over the open top to selectively close the open top, the lid structure having a mounted condition characterized by the lid structure being mounted on the beverage container and an unmounted condition characterized by the lid structure being removed from the beverage container; and a handle structure directly and removably mountable on the lid structure such that the handle structure is mountable on the base structure via the mounting of the handle structure on the lid structure when the lid structure is mounted on the base structure;

wherein the handle structure includes:

a collar portion defining an opening configured to receive a portion of the base structure, the collar portion extending about the opening; and at least one handle portion extending from the collar portion, the at least one handle portion being configured to extend generally adjacent to base structure when the handle structure and lid structure are mounted on the base structure;

wherein the lid structure comprises:

an upper wall positionable across the open top of the base structure when the lid structure is in the mounted condition;

an inner lip wall united to the upper wall, the inner lip wall being at least partially inserted into the open top of the base structure when the lid structure is mounted on the base structure, the inner lip wall being configured to engage the base structure;

an outer lip wall being positionable outside of the base structure when the inner lip wall is at least partially inserted into the base structure and the lid structure is mounted on the base structure, the outer lip wall being configured to engage the collar portion of the handle structure; and wherein the inner lip wall has an outward surface, the outward surface having exterior threads formed thereon to engage interior threads formed on an inner surface of the perimeter wall of the base structure; and wherein the outer lip wall has an inward surface, the inward surface having interior threads formed thereon to engage exterior threads formed on a section of an exterior surface of the collar portion of the handle structure.

10. A convertible beverage container having at least two configurations, the beverage container comprising:

a base structure having an interior configured to hold a liquid, the base structure having a closed bottom and an open top, the base structure comprising:

a perimeter wall extending between the bottom and top of the base structure; and a bottom wall positioned at the bottom of the base structure opposite of the open top;

a lid structure removably mountable on the base structure over the open top to selectively close the open top, the lid structure having a mounted condition characterized by the lid structure being mounted on the beverage container and an unmounted condition characterized by the lid structure being removed from the beverage container; and a handle structure directly and removably mountable on the lid structure such that the handle structure is mountable on the base structure via the mounting of the handle structure on the lid structure when the lid structure is mounted on the base structure;

wherein the handle structure includes:

a collar portion defining an opening configured to receive a portion of the base structure, the collar portion extending about the opening; and at least one handle portion extending from the collar portion, the at least one handle portion being configured to extend generally adjacent to base structure when the handle structure and lid structure are mounted on the base structure;

wherein the lid structure forms an annular gap between inner and outer lip walls, and the collar portion of the handle structure is at least partially insertable into the annular gap of the lid structure when the handle structure is mounted on the lid structure; and wherein one lip wall of the inner and outer lip walls of the lid structure has threads formed thereon, and a section of a surface of the collar portion is complementarily threaded to threads formed on the one lip wall to permit threaded mounting of the handle structure on the lid structure.

11. The container of claim 10 wherein the base structure, the lid structure, and the handle structure have a first configuration and a second configuration, the first configuration being characterized by the handle structure being mounted on the lid structure and the lid structure being mounted on the base structure, the second configuration being characterized by the lid structure being mounted on the base structure and the handle structure is dismounted from both the lid structure and the base structure.

12. The container of claim 9 wherein the lid structure forms an annular gap between inner and outer lip walls, and the collar portion of the handle structure is at least partially insertable into the annular gap of the lid structure when the handle structure is mounted on the lid structure.

13. The container of claim 9 wherein the base structure, the lid structure, and the handle structure have a first configuration and a second configuration, the first configuration being characterized by the handle structure being mounted on the lid structure and the lid structure being mounted on the base structure, the second configuration being characterized by the lid structure being mounted on the base structure and the handle structure is dismounted from both the lid structure and the base structure.

14. The container of claim 1 additionally comprising a sleeve element for selectively covering a portion of the base structure adjacent to the bottom of the base structure, the sleeve element being resiliently compressible.

15. The container of claim 10 wherein the at least one handle portion comprises a pair of handle portions, the handle portions being positioned at substantially opposite circumferential locations on the collar portion.

16. The container of claim 9 wherein the at least one handle portion comprises a pair of handle portions, the handle portions being positioned at substantially opposite circumferential locations on the collar portion.

17. The container of claim 10 wherein the handle structure and the lid structure are removable as a unit from the base structure.

18. The container of claim 9 wherein the handle structure and the lid structure are removable as a unit from the base structure.

19. The container of claim 1 wherein the upper wall has a sipping spout protruding outwardly from the container.

20. The container of claim 19 wherein the upper wall has a vent opening formed therein located opposite of the spout.

* * * * *